US012754017B2

(12) United States Patent
Wiesman

(10) Patent No.: US 12,754,017 B2
(45) **Date of Patent: *Oct. 6, 2026**

(54) DEVICE FOR INDICATING TIDAL WATER DEPTH

(71) Applicant: Wiesconcepts, LLC, Middle River, MD (US)

(72) Inventor: Jon P. Wiesman, Middle River, MD (US)

(73) Assignee: Wiesconcepts, LLC, Middle River, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,476

(22) Filed: Dec. 1, 2023

(65) Prior Publication Data

US 2024/0093991 A1 Mar. 21, 2024

Related U.S. Application Data

(63) Continuation of application No. 17/518,289, filed on Nov. 3, 2021, now Pat. No. 11,852,477.

(60) Provisional application No. 63/109,116, filed on Nov. 3, 2020.

(51) Int. Cl.
*G01C 13/00* (2006.01)

(52) U.S. Cl.
CPC .................................. *G01C 13/008* (2013.01)

(58) Field of Classification Search
CPC .... G01C 13/006; G01C 13/004; G01C 13/00; G01C 13/002; G01C 13/008; G01C 5/06; G01C 17/34; G01C 21/16; G01C 25/00; G01C 5/04; G01C 9/00; G01C 9/06; G01C 9/14; G01C 9/18; G01C 21/185; G01C 9/12
USPC .......................................... 73/170.29–170.34
See application file for complete search history.

(56) References Cited

U.S. PATENT DOCUMENTS

| | | | | |
|---|---|---|---|---|
| 3,352,017 | A | 11/1967 | Newberg | |
| 4,122,429 | A | 10/1978 | Hatai | |
| 5,363,307 | A | 11/1994 | Yoshida | |
| 5,884,408 | A * | 3/1999 | Simmons | G01B 3/004 33/761 |
| 2008/0309879 | A1 | 12/2008 | Hirji | |
| 2016/0216111 | A1 | 7/2016 | Higuchi | |
| 2022/0356690 | A1 | 11/2022 | Rothman et al. | |

FOREIGN PATENT DOCUMENTS

| | | | |
|---|---|---|---|
| CN | 107084708 | A | 8/2017 |
| JP | 0682157 | B2 | 10/1994 |
| JP | 2552684 | B2 | 11/1996 |

(Continued)

OTHER PUBLICATIONS

Keqi Zhang, et al., "Do Storms Cause Long-Term Beach Erosion along the U.S. East Barrier Coast?", The Journal of Geology, 2002, vol. 110, 10 pages.

(Continued)

*Primary Examiner* — Andre J Allen
(74) *Attorney, Agent, or Firm* — Barley Snyder

(57) ABSTRACT

A device and methods of placing the device for indicating tidal water depth is described. The device having a body in a vertical orientation, with a top, bottom, and at least one viewing surface, with a measurement scale of numerals and marks displayed on the at least one viewing surface, where the numerals increase in value in a direction from the bottom towards the top of the body.

21 Claims, 3 Drawing Sheets

(56) References Cited

FOREIGN PATENT DOCUMENTS

| | | | | |
|---|---|---|---|---|
| JP | 2003315468 | A | | 11/2003 |
| KR | 1797996 | B1 | | 12/2017 |
| KR | 20230089423 | A | * | 6/2023 |
| WO | 1991017456 | | | 11/1991 |

OTHER PUBLICATIONS

David T. Pugh, "Observations and Data Reduction" in Tides, Surges and Mean Sea-Level, published by John Wiley & Sons, dated 1987, pp. 23-42.

Ann Y. Mukai, et al., "Guidelines for Using Eastcoast 2001 Database of Tidal Constituents within Western North Atlantic Ocean, Gulf of Mexico and Caribbean Sea", dated Mar. 2002, 21 pages.

Tom Wolf, "The Dance at the Bridges, Boat U.S. Magazine", dated Oct.-Nov. 2019, 4 pages.

Thomas H. Whillans, "Changes in Marsh Area Along the Canadian Shore of Lake Ontario", 1982, 8 pages.

Nicole Palya Wood, "Train Traffic is about to boom in Florida, creating a safety hazard and obstructions for the hundreds of boats a day needing bridge openings between Miami and Orlando", https://www.boatus.com/expert-advice/expert-advice-archive/2015/2015/february/this-train-service-wont-amuse-boaters, Dated: Feb. 2015, 6 pages.

"Vertical Clearance Gauges" in Navigation and Navigable Waters, Dated: May 2, 1986, pp. 687-688.

* cited by examiner

DEVICE FOR INDICATING TIDAL WATER DEPTH

CROSS-REFERENCE TO RELATED APPLICATIONS

This present application is a continuation of U.S. patent application Ser. No. 17/518,289 filed on Nov. 3, 2021, which claims priority under 35 U.S.C. § 119 to U.S. Provisional Patent Application 63/109,116 filed on Nov. 3, 2020.

FIELD OF THE INVENTION

The invention relates to a device useful for indicating tidal water depth at a location in a body of water, which can be readily viewed at a distance by a user.

BACKGROUND

A major concern for boaters is running aground in shallow waters. Such an occurrence can result in extensive damage to the vessel, harm to personnel, and impact the environment, such as may be attributable to physical impact, and subsequent fuel spills. The costs associated with going aground in a vessel can turn a day of leisurely boating or productive commercial activity into an expensive venture.

While boaters have long relied upon nautical charts that provide an indication of depth, those charts are static, and do not reflect instant conditions. Conditions in saltwater, brackish and riverine environments are normally subjected to tidal swings, which vary with the phase of the moon, and additionally may be influenced by wind and storm surge. In flowing waterways, such as canals, and rivers, the tidal water depth may be affected by rainfall or drought conditions that will affect the depth of the waterbody, in addition to possible tidal influence.

Instant methods for determining depth can rely on the traditional technique of sounding, where depth is determined by plumbing the bottom with a weighted rope bearing markings to indicate depth. Alternatively, electronic depth finders, may be employed, using sound waves travelling at constant speed through water to record depth, with deeper water being more accurate than shallower waters. Depth finders allow a user to determine the depth of the water column below the depth finder, at the location where the boater is.

In turbid water, electronic depth finders may be affected by suspended sediment in the water column being sounded. For example, in shallow waters, agitation of the sediment on the bed from the action of the boat propellers will increase the turbidity, and affecting depth readings as sound waves become disrupted by the sediment load in the column.

It is previously known to provide visual measuring devices that provide an indication of clearance below an obstruction extending above a navigable waterway. For example, where a canal passes below a roadway bridge, it is known to provide measuring devices that may be secured in place, such as by being affixed to a piling of the bridge, and aligned in height and directionally oriented so as to allow a boater to visually confirm the maximum height restriction for a boat before attempting to pass below the obstruction. In such an instance, the visual measuring device would be positioned at a height that the numbers depicted on the scale would align with the corresponding distance from the clearance between the waterline up to the obstruction. This is especially useful in waterways that are subject to depth fluctuations, such as tidal swings, that would otherwise make it difficult to know the instant maximum height of a boat that could safely pass below the bridge or other obstruction. As can be seen with reference to FIG. 1, the prior art visual measuring device identifies the clearance in determinate units, whether in imperial units (feet as depicted), or metric units (such as meters), with the maximum height restriction identified on the scale by identifying the height corresponding to the current water line that is visible against the visual measuring device.

There is a need for a device that enables a boater to readily determine the depth, regardless of the turbidity of the water, that can provide the depth reading to a user located safely away at a distance from the point of measurement, prior to entry into the location being measured.

SUMMARY

In view of the foregoing, a depth marker device is provided. The device for indicating tidal water depth having a body having a vertical orientation and having a top, a bottom, and at least one viewing surface, and a measurement scale displayed on the at least one viewing surface having a plurality of numerals and marks, the numerals increasing in value in a direction from the bottom towards the top of the body. The depth marker device may be secured in a fixed position relative to a location within a body of water, where the placement is such that measurement scale is configured to indicate a depth of the body of water at the location.

In an exemplary embodiment, the depth marker device may be located within the body of water, and indicate a depth at the location that is one of a depth obstruction within the body of water, or a bed of the body of water. The indicated depth on the depth marker may be one of a depth at a location of the device, or a depth at a location in the vicinity of the device. In an exemplary embodiment, the device is at least partially within the body of water, and the body of water has a water line that aligns with one of the plurality of numerals and marks of the measurement scale, thereby indicating a depth on the measurement scale.

In an exemplary embodiment, the measurement scale is of a first color, and the at least one viewing surface is of a second color, where the first color contrasts with the second color. The measurement scale may be sized to be readily visually discernible by a viewer at distances greater than 100 feet. The device may further include an indicator configured to move vertically as the body of water changes in depth. In an embodiment, the indicator resides at a waterline of the body of water. In an exemplary embodiment, the indicator is vertically offset above a waterline of the body of water, and may be mechanically connected to a float that resides at a waterline of the body of water, such that the indicator moves correspondingly with the float. The measurement scale may be raised in an amount corresponding to a length of the mechanical connection between the indicator and float, such that the measurement scale and the indicator accurately reflect a depth for that waterline.

In an exemplary embodiment, the indicator may further include a cleaning component configured to physically dislodge material from the at least one viewing surface. The cleaning component may include one or more of bristles, blades, and combinations thereof.

In an exemplary embodiment, the indicator includes a maximum depth indicator, which may be periodically returned to a first position.

In an exemplary embodiment, the body of the depth marker device is a corrosion resistant material. The body may include one or more materials selected from polystyrene, polyethylene, polypropylene, acrylonitrile butadiene styrene (ABS), polycarbonate, polyether ether ketone (PEEK), polyoxymethylene (POM), polytetrafluoroethylene, nylon, and metals or alloys of aluminum, stainless steel, copper, brass, titanium, and combinations and alloys thereof.

In an embodiment, at least a portion of the device is coated with one or more of a corrosion inhibitor, UV inhibitor, anti-fouling layer, and reflective coating.

In an embodiment, the measurement scale may be viewable from a plurality of angles. The body may include at least four viewing surfaces, where the body is a right prism. In another embodiment, the body comprises a right cylinder.

In an embodiment, the method of placing a device for indicating tidal water depth include the steps of: (1) providing a body having a vertical orientation and having a top, a bottom, and at least one viewing surface; and a measurement scale displayed on the at least one viewing surface having a plurality of numerals and marks, the numerals increasing in value in a direction from the bottom towards the top of the body; (2) measuring the depth of a location against a reference point in determinate units; and (3) securing the body in a position wherein the reference point aligns in height with the indication of the measured depth on the measurement scale.

BRIEF DESCRIPTION OF THE DRAWINGS

The invention is explained in greater detail below with reference to embodiments and the appended drawings of which.

DETAILED DESCRIPTION OF THE EMBODIMENT(S)

Figure 2:
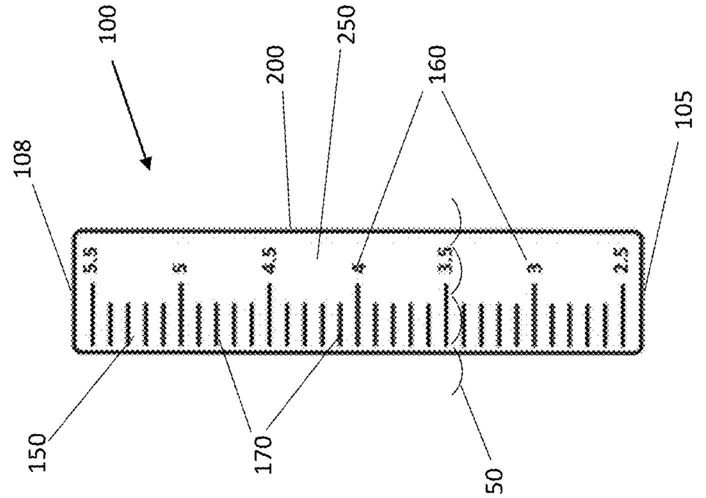
FIG. 2 is a front view of an embodiment of a measuring device.

With reference to the exemplary embodiment depicted in FIG. 2, there is shown a device 100 that provides a body 200, typically a flat surface, featuring a measurement scale 150 thereon. The measurement scale is made up of numerals 160 and marks 170 identifying repeating units of measurement relevant to the location used, for example, such as centimeters or meters, or alternatively, feet or inches. It is contemplated that the device 100 may be provided with markings in any suitable measurement scale, typically the above referenced metric and imperial units, or fathoms. It is further contemplated that the device 100 may provide multiple visible scales, for example, having both metric and imperial units of measure, where it may be useful for the expected user population, such as in areas where international commerce occurs. In such an instance, different scales may be provided in the same, or different colors, which contrast highly with the background field color of the flat surface, in order to enhance visibility. The scales may be placed along the same imaginary vertical line, where the scales are distinguishable based upon color difference, or more preferred, the two scales may share the same visible surface, where one scale is placed on the left side of the surface, and the other scale is placed on the right side of the surface, thus making it easier to distinguish the two scales from each other.

The depicted device 100 provides a measurement scale 150 with marks 170 and numerals 160 that allow visual confirmation by a user of the current depth at a specific location, which may be the precise location of the device 100, or a known depth restriction in the immediate vicinity or waterway that the boater will have to navigate, when the device 100 is properly placed in situ. By placing the depth indicator device 100 in the vicinity of the known depth restriction, it is meant that the elevation of the surface of the body of water at the known depth restriction or waterway would accurately be represented by the elevation of the surface of the body of water forming the waterline where the measurement indicator device is placed. Furthermore, the term “vicinity” is typically within 1 mile, within 1000 yards, within 300 yards, within 100 yards, or within 10 yards of the depth restriction being indicated on the depth indicator. For example, where a navigable waterway is subject to depth fluctuations (such as tides), and there is a need for a boater to be aware of the current depth at that location, the device 100 may be placed in a visible location, within or near the point to be identified in the waterway, placed at a height where the waterline 50 visible on the measurement scale 150 will align with an indicated depth that corresponds to the actual depth at that location. Where the device has markings arranged vertically, the proper mounting would be in a vertical orientation that is perpendicular to the waterline, and at a height that is set so as to ensure that the indicator numbers 160 and marks 170 correspond with either the actual distance from the waterway bottom, or reflect the depth of an obstruction underneath the water surface (such as a shipwreck or coral reef), that creates the need to identify the maximum draft of a passing water vehicle in the vicinity of the underwater obstruction.

As depicted in FIG. 2, the device 100 body 200 has a front surface 250, bearing the marks 170 and numerals 160 as a measurement scale 150 visually detectable on the front surface 250, such that a user may remotely determine the depth at the indicated point by observing where the water line aligns on the measurement scale 150. The device 100, when placed in the intended vertical orientation, will provide a front surface 250 facing a viewer, the measurement scale 150 depicted will have the indicated numbers 160 increasing in value in a direction from the bottom 105 of the device 100 towards the top 108, such that the measurement scale 150 reflects a greater depth measurement from the water line as the water level climbs. By contrast, and as can be seen with reference to the overhead clearance indicator depicted in FIG. 1, the scale in the prior art device is provided in reverse of that of FIG. 2, where the clearance indicator of FIG. 1 bears markings or numbers at locations closest to the top of the prior art clearance indicator that are lower, and the numbers increase as the water line is shifted closer to the bottom of the indicator.

In an embodiment, the device 100 of FIG. 2 may have the same measurement scale 150 on a back surface of the device, such that a user approaching the location from the opposite direction will be able to determine the current depth. In such an instance, the device 100 should be mounted in a manner that will ensure that the view of the device is not obstructed, when seen from either direction of approach. This may be accomplished, for example by mounting from a side, or offset from a fixed object, such as a piling, structure, or bridge, in order to prevent the structure blocking view of the device from relevant directions.

Figure 3B:
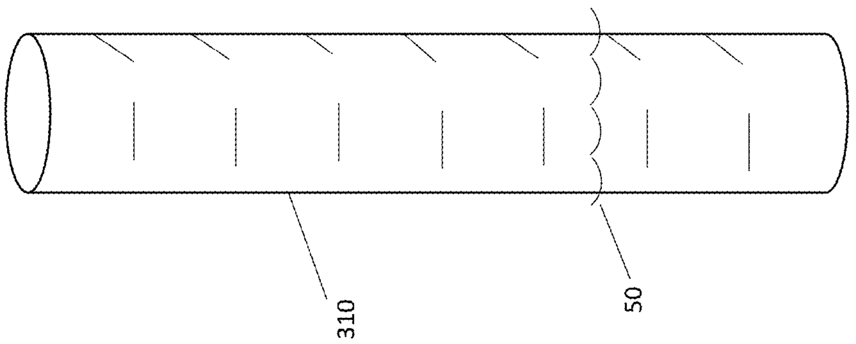
FIGS. 3A and 3B represent alternate embodiments of a measuring device.
Figure 3A:
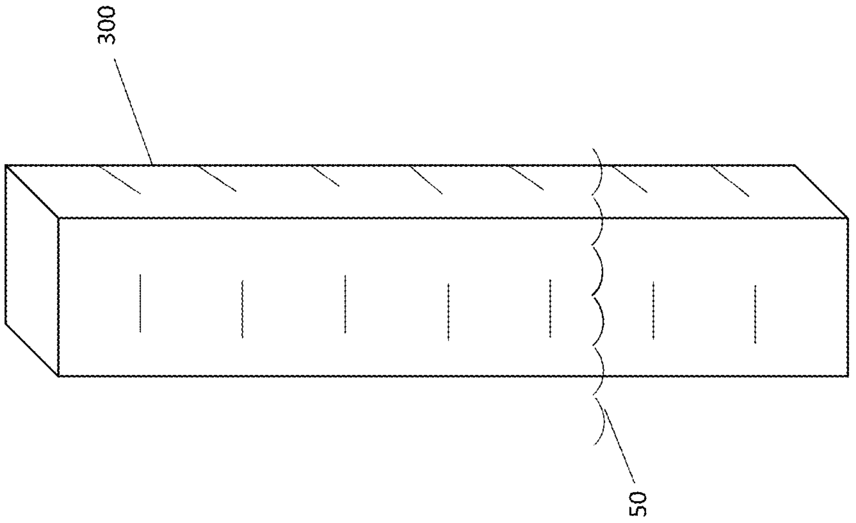

In another embodiment, the device 100 may be a 3-dimensional prism, for example, the device 100 may be a triangular prism (not shown), or as depicted in FIG. 3*a*, a rectangular prism 300. It is contemplated in an embodiment providing for viewing from multiple angles, that any prism providing at least 2 viewing surfaces may be employed, with the depth marks 170 and numbers (not shown) for a measurement scale 150 placed on one or more of the prism vertical surfaces. In another embodiment, as depicted in FIG. 3B, the device may be a right cylinder 310, provided with depth marks 170 and numbers (not shown) for a measurement scale 150 depicted repeatably or continuously about the vertical perimeter of the right cylinder, so as to allow detection of depth from a plurality of viewing angles.

The method of placement and use of the depth indicator device 100 may be accomplished by initially determining the tidal water depth at a desired location. This can be performed by any suitable manner known in the art, such as electronic depth sounding, or physically plumbing the depth of the water using, for example, a weighted rope, or alternatively using any suitable measuring device to identify the current depth. With the depth known, the device 100 may be mounted or affixed at a height that the waterline will be aligned with the marks 170 of the measurement scale 150 on the device 100 that corresponds to the measured depth.

Alternatively, where the device 100 is to be mounted to a securely fixed object, such as a bridge or dock piling, the depth to the waterway bottom or maximum depth to an obstruction may be determined from a reference point on the fixed object, preferably above the water line. The depth indicator device 100 may then be mounted to the fixed object, with the depth marks 170 value on the measurement scale 150 that corresponds to the previously measured value for the reference point being in height alignment with the reference point. For example, where a selected reference point is determined to be 8 feet, 6 inches above the waterway bottom or obstruction, the depth indicator device 100 is to be mounted at a height where the indicated value on the measurement scale 150 corresponding to 8 feet, 6 inches is aligned in height with the reference point. In this manner, the depth indicator device 100 may be mounted accurately, even after a delay, irrespective of any change in the tidal water depth between the measurement and the actual mounting of the device 100.

Mounting of the depth indicator device 100 to the fixed object may be performed in any suitable manner for achieving the secure placement of the device 100 in the face of the conditions to which the device will be exposed. For example, securement of the device 100 may be achieved through the use of one or more fasteners as are known to those skilled in the art, directed through the device 100 itself, or a bracket securely affixed to the device 100, and the fastener securely fastened to a mounting surface of the fixed structure serving as the support for the device. Alternatively, marine-suitable adhesives or epoxies may be employed to secure the depth indicator device 100 to a fixed structure. In either event, the fastening technique employed should be capable of securely maintaining the device 100 in position and will ensure the device will be resistant to being dislodged in the course of its exposure to variable water currents, floods, waves, physical impact, and weather.

In an exemplary embodiment, the device 100 of FIG. 2 or any of the embodiments described herein may be constructed from a corrosion resistant material, and is suitable for placement in a marine environment, including, as non-limiting examples, polymer materials, non-ferrous metals, ceramic material. The device 100, for example, as depicted in the embodiment of FIG. 2, will have numerals 16 and marks 170 making up the measurement scale 150 that will remain readily visible, even after significant exposure to weather, sun, and marine environment. Exemplary materials for the device 100, body 200 and measurement scale 150 components may include, but are not limited to, one or more of: polystyrene, polyethylene, polypropylene, acrylonitrile butadiene styrene (ABS), polycarbonate, polyether ether ketone (PEEK), polyoxymethylene (POM), polytetrafluoroethylene, nylon, and metals or alloys of aluminum, stainless steel, copper, brass, and titanium. The measurement scale 150 marks 170 and numerals 160 may painted, affixed with fasteners, embossed, or overmolded or co-extruded on to the body 200 of the device 100, and provided in a contrasting color against the background field of the body 200 of the device 100, in order to provide readily visible depth marks 170 that are durable, and remain visible, even after significant exposure in harsh environments.

For ease of view in varying visibility and light conditions, high contrast between the colors for the measurement scale 150 marks 170 and numerals 160, and the background field color on the body 200 of the depth indicator device 100 are preferred. Suitable color combinations include, but are not limited to black/white, yellow/black, white/red, or any suitable color combination of colors that strongly contrast against each other are desirable. Color selection may also be determined in compliance with relevant regulations regarding signage. Either or both of the number 160 and depth marks 170, or the background of the body 200, may incorporate reflective materials, so as to enhance visibility in low light conditions or at night. Typically, black numerals 160 and scale marks 170 would be provided on a white background of the body 200 of the device 100. If the device 100 is painted, the paint should include a UV inhibitor in a high performance paint, and may include an infrared-reflective additive, in order to enhance low light visibility, and further ensure the longevity of the marks 170 and numerals 160 of the measurement scale 150 on the device 100.

The font for marks 170 and numerals 160 on the measurement scale 150 should ideally be visible by a boater at a suitable distance, ideally at distances in excess of 100 feet. The appropriate size of the marks 170 and numerals 160 on the measurement scale 150 may be determined using the Snellen acuity equation where the character size, for a person of 20/20 vision should be sized at 8.87 millimeters at 20 feet, thus the numerals 160 should be 0.433 millimeters of character height for each foot of viewing distance desired. Thus, suitable marks and numerals 160 for the device 100 visible at 100 feet by a person of 20/20 vision should have numerals 160 with a height that is 5 times greater than that specified for a 20-foot viewing distance, and should be at least 44.35 millimeters in height (5×8.87 mm), with proportional font thickness.

Alternatively, the numerals 160, and optionally scale marks 170, may be sized as required by relevant regulations regarding navigation aids, and may be a minimum of 12 inches in height, with a vertical spacing between marker numbers of 2 feet (therefore identifying every other foot marker in numeral form). For better viewing at greater distances, the numerals 160 may be increased proportionally, or as otherwise required by relevant regulations.

In an embodiment, all or a portion of the device 100, or the body 200 and/or measurement scale 150 numerals 160 and marks 170 may be treated or have a coating, or have a surface characteristic or property, such as texture or material, which may provide anti-fouling properties, so as to allow the marker device to resist algal growth, bio-fouling, or attachment or build-up of living materials on the surface 250 that would otherwise obstruct the view of the measurement scale 150 on the device. In this manner, it is contemplated that the device 100 described herein may avoid or minimize the buildup of algal growth, as can be seen occurring on a portion of the clearance measuring device of prior art FIG. 1. It is further contemplated that all or a portion of the device 100 may be coated or treated in order to minimize or prevent corrosion attributable to continuous exposure to a marine environment. In an embodiment, all or a portion of the device 100 may have applied a coating with a UV inhibitor, to minimize damage from UV exposure, such as polymer degradation, and color fading. It is contemplated that multiple surface treatments may be beneficially combined or applied in layered form to the depth indicator device 100.

Figure 4:
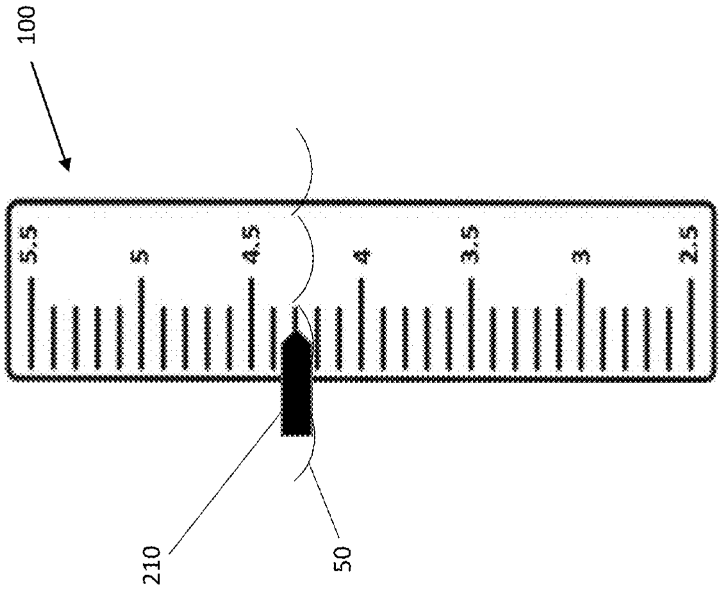
FIG. 4 is a front view of an embodiment of a measuring device having an indicator.

In an exemplary embodiment, the device 100 may be provided with an indicator 210, as depicted in the exemplary embodiment of FIG. 4. In one embodiment, the indicator 210 serves to visually identify the water line for the user, as the indicator would be buoyant, or affixed to a buoyant component, and the indicator would be capable of vertical movement with varying water levels.

In another embodiment, the indicator 210 serves as a maximum depth measurement indicator, reflecting the high water mark recorded. Such a maximum measurement indicator 210 may be capable of moving in an upward direction as the depth of the water increases, and remains at the peak height detected, at least temporarily. For example, the maximum measurement indicator 210 may feature a one-way movement of the indicator 210, such as by a ratchet and pawl mechanism, or alternatively, a friction fit of the indicator 210 slidably mounted on a rail or the device 100, where the buoyancy of the indicator 210, or a buoyant article secured to the indicator 210, is sufficient to overcome the friction fit, whereupon the indicator slides on the rail as the water level urges the indicator 210 upwards, acting upon the buoyancy of the indicator itself, or the buoyant article. However, as the water level recedes, the friction of the indicator 210 on the rail is sufficient to maintain the indicator at the peak height, as the weight of the indicator is not so great that it would cause the indicator to overcome the friction holding the indicator in the raised position, where it would otherwise slide down in the absence of the friction. A ratchet and pawl would behave similarly, providing one-way movement upwards, and arresting downward movement of the indicator 210. The indicator 210 may be periodically reset, with the effect that the indicator is returned to the original position, or lowered to the current water level. The resetting of the indicator 210 may be manual, automated, or actuated as needed. For example, the maximum measurement indicator 210 may reset, when the water level hits a set low-point, or other periodic trigger. In an embodiment, the reset trigger may cause the rail to move in a manner that would result in reduced friction of the fit of the maximum measurement indicator 210 upon the rail or against the device 100, such that the indicator 210 may return to initial state or lowered position, acted upon by gravity. In another embodiment having the rachet and pawl mechanism for the maximum depth indicator 210, there may be a manner of disengaging the pawl from the ratcheting action, allowing the reset of the indicator 210 to its initial or lower starting position.

In another embodiment of the exemplary depth indicator device 100 depicted in FIG. 4, the indicator 210 may indicate the current depth reading, and be a contrasting color float that rides or rests at or near the surface of the water level, and provides easier reading of the measurement scale 150 at a distance, where the water line may be more difficult to detect. In such an embodiment, the indicator 210 would reflect the current water level, moving upwards and downwards against the measurement scale 150 in concert with the changing water level.

One or both of the indicator 210 or optional buoyant article may be a float made up of a closed cell foam, or a low density material, such as polystyrene foam, or sealed containers, similar to the construction of buoys or boat bumpers, that would float at the surface, and would be durable and whose buoyancy would be impervious to, or unaffected by, water penetration into the float.

Figure 5:
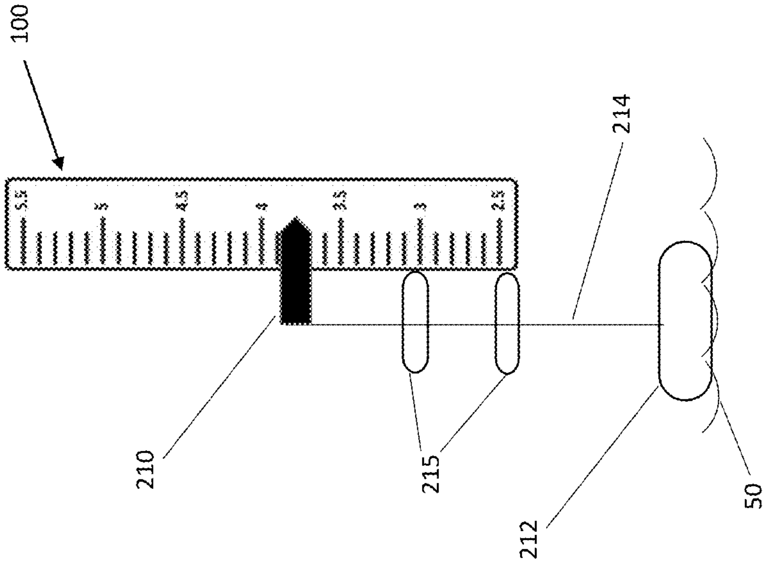
FIG. 5 is a front view of an embodiment of a measuring device having an indicator that is offset in a vertical direction by mechanical connection to a float.

It is also contemplated that in the exemplary embodiment of FIG. 5, the water level may be indicated using a float 212 in combination with an offset depth indicator 210, where the float 212 is connected to a depth indicator 210 by a mechanical connection 214, such as a rigid columnar material that is able to maintain a consistent distance between the depth indicator 210 and the float 212. In this embodiment, as the indicator 210 is fixed in height relative to the float 212, the indicator 210 will move in concert with the float 212 as the water level rises and falls. It is contemplated that the columnar material could be loosely mounted in a plurality of vertically aligned fixtures 215, such as eyelets, each secured to a fixed object, such as the mounting structure, or to the body 200 of the device 100 directly. In such a manner, the rigid column of the mechanical connection 214 would be free to move vertically within the aligned fixtures 215. In this embodiment, the depth indicator device 100 with the measurement scale 150 on a front surface 250 would be mounted with a similar vertical height offset as the offset between the float 212 and the indicator 210, and ensuring that the relevant water heights reflected on the measurement scale 150 would be accurate, and would allow the relevant portion of the measurement scale 150 to be maintained clear from fouling, such as algae growth, as the water level will consistently be below the indicator 210 by the height of the offset. For example, where the float 212 supports an indicator 210 four feet above the float, the relevant measurement scale 150 would be correspondingly be moved upwards by four feet as well, and any fouling due to being immersed continuously in the water would be reflected on the scale at a location that is generally 4 feet below where the indicator 210 is indicating.

Figure 1:
Figure 1 Prior Art
FIG. 1 is a front perspective view of a prior art minimum clearance measuring device positioned to provide an indication of height clearance below an obstruction over a waterway.

By way of comparative example, the algal fouling on a prior art device can be seen in FIG. 1, where the water level indicates the clearance directly on the scale.

Referring again to the embodiment of FIG. 5, the issue of biofouling may thus be alleviated by elevating the measurement scale 150 by the amount of vertical offset between the depth indicator 210 and the float 212, thus it is anticipated that any build up of algae or biofouling that might occur may be below the relevant portion of the measurement scale 150 that reflects the anticipated depth range at that location. Ideally, the amount of offset is equal to, or greater than the anticipated regular water level variation. In this embodiment, even if there is significant fouling attributable to being in the water, the relevant portion of the scale 150 for the depth indicator device 100 would be expected to remain above the maximum water level, and would remain free from fouling.

Figure 6:
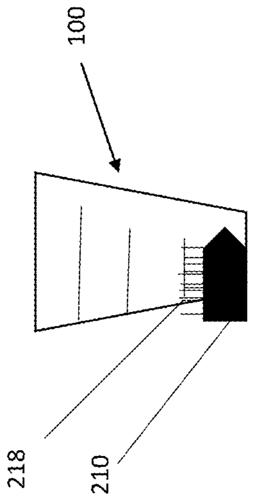
FIG. 6 is an elevated front perspective view of an embodiment of a measuring device having an indicator with cleaning bristles to dislodge biofouling and growth from the surface of the measuring device.

In an embodiment depicted in FIG. 6, there is provided a top perspective view depicting the front surface from a high elevation. In the depicted embodiment, as the indicator travels vertically with the changing water level, the sliding action of the indicator 210 or other float mechanism over the front surface 250 and the measurement scale 150 of the device 100 may also physically disrupt the formation of fouling of the measurement scale 150 and front surface 250. As shown, the indicator 210 provides for one or more cleaning components 218, such as bristles or scraping blade, to physically dislodge fouling material, whether by scraping or brushing away algae, moss, mildew, barnacles, or other growth that would otherwise foul the body surface 250, as the indicator 210 is caused to move with the varying water level. The bristles or blade ideally would be stiff enough to dislodge the biogrowth as the repeated vertical movement leads to a slow scrubbing action, but should avoid damaging the scale or visible surface of the device 100 as the indicator is moved relative to the measurement scale 150.

The foregoing illustrates some of the possibilities for practicing the invention. Many other embodiments and fields of use for the depth indicator are possible and within the scope and spirit of the invention. It is, therefore, intended that the foregoing description be regarded as illustrative rather than limiting.

What is claimed is:

1. A device for indicating tidal water depth comprising:
- a body having a vertical orientation and having:
  - a top,
  - a bottom, and
  - at least one viewing surface; and
- a measurement scale displayed on the at least one viewing surface having a plurality of markers, the measurement scale is of a first color, and the at least one viewing surface is of a second color, where the first color contrasts with the second color, the markers indicating an increase in value in a direction from the bottom towards the top of the body, the device is configured to be secured in a fixed position relative to a location within a body of water.

2. The device of claim 1, wherein the placement is such that the measurement scale is configured to indicate a depth of the body of water at the location.

3. The device of claim 2, wherein the location within the body of water is one of a depth obstruction within the body of water, or a bed of the body of water.

4. The device of claim 3, wherein the indicated depth is one of a depth at a location of the device, or a depth at a location in the vicinity of the device.

5. The device of claim 4, wherein the device is at least partially within the body of water.

6. The device of claim 5, wherein the body of water has a water line that aligns with one of the plurality of numerals and marks, thereby indicating a depth on the measurement scale.

7. The device of claim 1, wherein the measurement scale is sized to be readily visually discernible by a viewer at distances greater than 100 feet.

8. The device of claim 1, further comprising an indicator configured to move vertically as the body of water changes in depth.

9. The device of claim 8, wherein the indicator is vertically offset above a waterline of the body of water.

10. The device of claim 8, wherein the indicator is mechanically connected to a float that resides at a waterline of the body of water, such that the indicator moves correspondingly with the float.

11. The device of claim 8, wherein the measurement scale is raised in an amount corresponding to a length of the mechanical connection between the indicator and float, such that the measurement scale and the indicator accurately reflect a depth for that waterline.

12. The device of claim 10, wherein the indicator further comprises a cleaning component configured to physically dislodge material from the at least one viewing surface.

13. The device of claim 12, wherein the cleaning component comprises one or more of bristles, blades, and combinations thereof.

14. The device of claim 1, wherein at least a portion of the device is coated with one or more of a corrosion inhibitor, UV inhibitor, anti-fouling layer, and reflective coating.

15. The device of claim 1, wherein the measurement scale is viewable from a plurality of angles.

16. The device of claim 15, wherein the body comprises at least 4 viewing surfaces, and said body is a right prism.

17. The device of claim 1, wherein the body comprises a right cylinder.

18. A device for indicating tidal water depth comprising:
- a body having a vertical orientation and having:
  - a top,
  - a bottom, and
  - at least one viewing surface; and
- a measurement scale displayed on the at least one viewing surface having a plurality of markers, the measurement scale is of a first color and is sized to be readily visually discernible by a viewer at distances greater than 100 feet, and the at least one viewing surface is of a second color, where the first color contrasts with the second color, the markers indicating an increase in value in a direction from the bottom towards the top of the body.

19. A device for indicating tidal water depth comprising:
- a body having a vertical orientation and having:
  - a top,
  - a bottom, and
  - at least one viewing surface;
- an indicator configured to move vertically as a body of water changes in depth; and
- a measurement scale displayed on the at least one viewing surface having a plurality of markers, the measurement scale is of a first color, and the at least one viewing surface is of a second color, where the first color contrasts with the second color, the markers indicating an increase in value in a direction from the bottom towards the top of the body.

20. A device for indicating tidal water depth comprising:
- a body having a vertical orientation and having:
  - a top,
  - a bottom, and
  - at least one viewing surface; and
- a measurement scale displayed on the at least one viewing surface having a plurality of markers, the measurement scale is of a first color, and the at least one viewing surface is of a second color, where the first color contrasts with the second color, the markers indicating an increase in value in a direction from the bottom towards the top of the body, at least a portion of the device is coated with one or more of a corrosion inhibitor, UV inhibitor, anti-fouling layer, and reflective coating.

21. A device for indicating tidal water depth comprising:

a body having a vertical orientation and having:

a top, a bottom, and at least one viewing surface, the body comprises a right cylinder; and a measurement scale displayed on the at least one viewing surface having a plurality of markers, the measurement scale is of a first color, and the at least one viewing surface is of a second color, where the first color contrasts with the second color, the markers indicating an increase in value in a direction from the bottom towards the top of the body.

* * * * *